United States Patent
Lesartr et al.

(10) Patent No.: US 7,543,291 B2
(45) Date of Patent: Jun. 2, 2009

(54) PROCESSOR PURGING SYSTEM AND METHOD

(75) Inventors: Gregg Bernard Lesartr, Ft. Collins, CO (US); Douglas Shelborn Stirrett, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1106 days.

(21) Appl. No.: 10/632,772

(22) Filed: Aug. 1, 2003

(65) Prior Publication Data

US 2005/0028163 A1 Feb. 3, 2005

(51) Int. Cl.
  *G06F 9/46* (2006.01)
  *G06F 9/26* (2006.01)
  *G06F 9/34* (2006.01)
(52) U.S. Cl. .................. 718/100; 711/205; 711/207
(58) Field of Classification Search .................. 711/204, 711/205, 207, 200; 709/213; 718/100
See application file for complete search history.

(56) References Cited

U.S. PATENT DOCUMENTS

| 4,733,348 | A | | 3/1988 | Hirsoka et al. |
| 5,437,017 | A | * | 7/1995 | Moore et al. ............... 709/213 |
| 5,758,178 | A | | 5/1998 | Lesartre |
| 5,781,918 | A | | 7/1998 | Lieberman et al. |
| 6,539,466 | B1 | | 3/2003 | Riedlinger |
| 6,560,689 | B1 | * | 5/2003 | Mathews et al. ............ 711/204 |

* cited by examiner

*Primary Examiner*—Meng-Ai An
*Assistant Examiner*—Eric C Wai

(57) ABSTRACT

A processor purging system comprising a translation lookaside buffer (TLB) having a plurality of translation pairs, at least one memory cache, and logic configured to detect whether at least one of the translation pairs corresponds to a purge signal. The logic is further configured to assert a purge detection signal indicative of whether at least one translation pair corresponds to the purge signal and to determine, based upon the purge detection signal, whether to search the memory cache for a translation pair corresponding to the purge signal.

19 Claims, 7 Drawing Sheets

PROCESSOR PURGING SYSTEM AND METHOD

BACKGROUND

A processor often comprises a translation lookaside buffer (TLB), which is used to implement virtual memory. The TLB typically operates as a cache for a plurality of "translation pairs," wherein each translation pair maps or translates a virtual address to a physical address. Because the translation from a virtual address to a physical address often involves large complex data structures that a processor would be unable to efficiently store, a TLB is used to store the most recently accessed translation pairs for quick use by the processor.

Generally, control logic of the processor presents a virtual address to a memory management unit (MMU), which is often located on the processor. The MMU refers to a logical unit that manages access to a defined address space such as, for example, the virtual address space defined for a system implementing a virtual memory architecture. The MMU first searches the TLB for the translation pair related to the virtual address presented. If the virtual address is not found in the TLB, then the processor accesses a page table, which is usually stored in random access memory (RAM), located external to the processor, to bring the translation into the TLB. A page table generally refers to a data structure that provides a map between virtual addresses and physical addresses. The page table is normally indexed by page number and contains information on where the page is located within a memory hierarchy (e.g. disk, main memory, etc.).

The TLB typically holds a limited number of translation pairs. Consequently, as the MMU inserts translation pairs into the TLB, it also periodically removes translation pairs to make room for new translation pairs. The removal of translation pairs can be done randomly, or it can be based upon some logical algorithm. For example, the least used translation pair may be removed first. The TLB can also hold other information from the page table, which may be desirable to manage access to the pages referenced by a given translation pair.

Further, if a system change renders a TLB translation pair inaccurate, then the inaccurate translation pair is often explicitly purged so that the processor will not attempt to access memory based on the inaccurate translation pair. For example, the page table may be updated, thereby making a translation that is currently stored in the TLB obsolete. This translation pair may be purged from the TLB in response to the page table update.

In a multiprocessor system, a global page table is often used to manage RAM, and each processor has its own TLB, which stores translation pairs related to processes owned by each processor in the system. In this regard, if a system change occurs that modifies the page table, then the operating system transmits a purge signal to each of the processors in the multiprocessor system, so that if a processor's TLB contains a translation pair related to the modification in the page table, then the processor can purge the TLB translation pair and purge any mini-TLBs or instruction queues that may attempt to use data related to the deleted address.

At times, a processor can become so busy responding to purge signals transmitted by the operating system that "starvation" occurs. Starvation is a term used to describe unproductive operation of a processor when it is unable to proceed with subsequent instructions due to the lack of usable resources.

SUMMARY OF THE DISCLOSURE

Generally, an embodiment of a processor purging system of the present disclosure comprises a translation lookaside buffer (TLB) having a plurality of translation pairs, at least one memory cache, and logic configured to detect whether at least one of the translation pairs corresponds to a purge signal. The logic is further configured to assert a purge detection signal indicative of whether at least one translation pair corresponds to the purge signal and to determine, based upon the purge detection signal, whether to search the memory cache for a translation pair corresponding to the purge signal.

A processor purging method in accordance with the present disclosure comprises the steps of detecting whether at least one translation pair in a plurality of translation pairs within a translation lookaside buffer (TLB) corresponds to a purge signal; asserting a purge detection signal indicative of whether at least one of the translation pairs corresponds to the purge signal; and determining, based upon the purge detection signal, whether to search the memory cache for a translation pair corresponding to the purge signal.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to systems and methods that purge resident processor components (e.g., TLBs, mini-TLBs, instruction queues, etc.) based upon verification that a translation pair within a translation lookaside buffer (TLB) corresponds to a system purge signal. Specifically, a system in accordance with one embodiment of the present disclosure detects logical values indicative of whether a translation pair corresponding to a purge signal is found in the TLB. The system translates these logical values into a single logical value, which indicates whether a TLB hit or a TLB miss occurred, i.e., whether a translation pair in the TLB corresponds to the data contained within the purge signal. If the logical value indicates a TLB hit, then the processor, in one embodiment, purges the matching translation pair and/or translation pairs in the TLB. In addition, the processor clears any processor components that may be affected by the system change. For example, the processor may proceed with purging resident mini-TLBs and/or instruction queues. However, if the logical value indicates a TLB miss, then no TLB translation pair is purged, nor are resident mini-TLBs and/or instruction queues cleared. Thus, the risk of starvation of a processor in a multiprocessor system is decreased by eliminating the need to purge system structures unless a translation hit was detected. Only a limited number of hits are possible since the TLB is a finite size.

Figure 1:
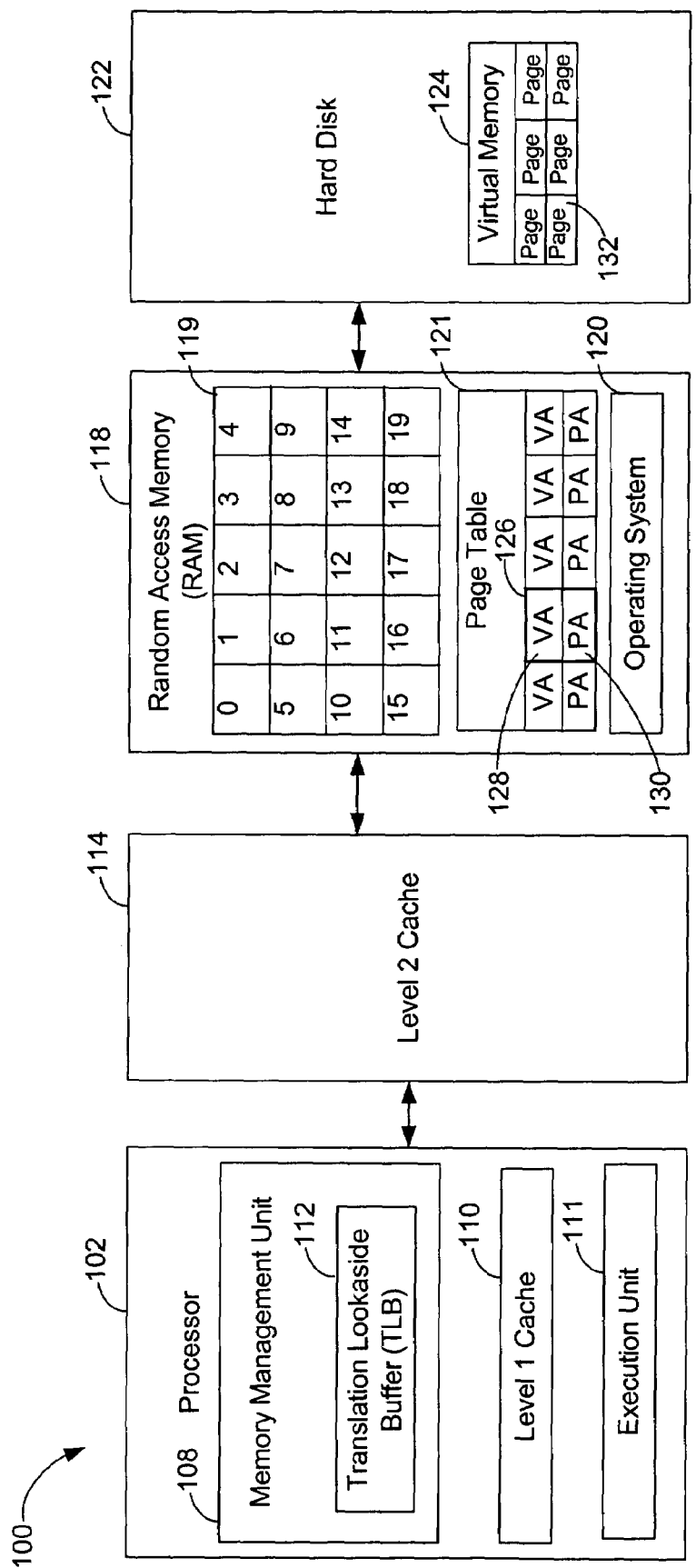
FIG. 1 is a block diagram illustrating a conventional memory access hierarchy.

A general description of a conventional processor's hierarchical memory management flow is described hereafter with reference to FIG. 1. As indicated, a system 100 includes a processor 102, level two (2) cache (L2 cache) 114, random access memory (RAM) 118, and a hard disk 122. For illustrative purposes, the processor 102 is illustrated comprising level one (1) cache (L1 cache) 110, execution unit 111, and a resident memory management unit (MMU) 108, which comprises a translation lookaside buffer (TLB) 112. Alternatively, the MMU 108 may be separate and apart from the processor 102 and embodied in a discrete integrated circuit that communicates with the processor via a bus arrangement, for example. Further, note that the TLB 112 may be implemented as a resident processor component, which operates independently of a MMU 108, and the execution unit 111 may communicate directly with the TLB 112.

The system 100 comprises virtual memory architecture including a page table 121, comprising translation pairs 126, and virtual memory 124, created from a partitioned portion of the hard disk 122. Each translation pair 126 within the page table 121 comprises a virtual address (VA) 128 and a physical address (PA) 130. The page table 121 facilitates copying virtual memory 124 from the hard disk 122 into RAM 118. In this regard, the operating system 120 divides virtual memory into pages 132, and each page 132 contains a fixed number of addresses. Note that a page refers to a fixed amount of data, and the size of a page may be determined by the configuration of the system. Each page 132 is stored on the hard disk 122 until it is needed for use by the execution unit 111.

When the processor 102 indicates that a page is needed by the execution unit 111, the operating system 120 translates the virtual address into the physical address (i.e., physical location on the hard disk 122) in accordance with translation pairs 126 of the page table 121, locates the page 132 on the hard disk 122 using the physical address, and copies the page 132 from the hard disk 122 to a page frame 119 of RAM 118. The process of translating a VA to a PA is also referred to as "mapping," and copying the page 132 to a page frame 119 of RAM 118 is also referred to as "swapping." Note that a VA 128 is that address associated with the location of a page of memory in the virtual memory 124, and the PA 130 is that address associated with the actual hardware location of the page.

During operation, the processor 102 employs the L1 cache 110 and the L2 cache 114 to store data that it can access quickly, such as, for example, instructions that are frequently executed by the execution unit 111. In addition, the processor 102 reads and writes data to random access memory (RAM) 118. The processor 102 accesses RAM 118 by requesting that the MMU 108 load additional data into RAM 118 that it needs to operate. As such, the execution unit 111 may present the MMU 108 with a VA corresponding to a page in virtual memory 124. The MMU 108 initially searches the TLB 112 in order to retrieve the physical address, i.e., the physical location of the data in memory. If a translation pair associated with the VA is not in the TLB 112, i.e., there is a TLB miss, then the MMU 108 uses the page table 121 in RAM 118 in order to load the TLB and to translate the VA to the PA of the memory. The page table 121 indicates if the page to which the VA refers is presently loaded in a page frame 119 of RAM 118 or whether it is in virtual memory 124 of the hard disk 122.

If the page is not currently loaded in a page frame 119 of RAM 118, then the operating system 120 loads the desired page associated with the PA from the virtual memory 124 to a page frame 119, so that the processor 102 may access the data contained in the pages more quickly. Further, the MMU 108 inserts the virtual/physical translation pair associated with the most recent VA request from the execution unit 111 into the TLB 112. Thus, the TLB 112 stores a list of translation pairs representative of the most recently accessed memory pages.

During operation of system 100, the operating system 120 periodically transmits "purge signals" to the processor 102 in response to system events that indicate one or more translation pairs may be stale, e.g., the virtual address or PA of the page may have changed. Such purge signals may indicate that the status of the page has changed, and any reference to such page needs to be updated in the TLB. In response to such a purge signal, the MMU 108 searches the TLB 112 for the stale translation pair identified by the purge signal and purges the stale translation pair, if it is present in the TLB 112. The MMU 108 also purges other processor components, for example mini-TLBs or instruction queues that may be affected by the stale translation pair. Moreover, the processor 102 may purge the L1 cache 110 and/or any instruction queue that may be resident on the processor 102 and that could possibly contain a page reference to the purged translation pair. In so purging, the processor 102 eliminates the risk that it will attempt to access stale or unavailable data via a stale translation pair or that it will attempt to execute an instruction related to the stale translation pair. Typically, these other structures are flushed on the receipt of any TLB purge signal.

Figure 2:
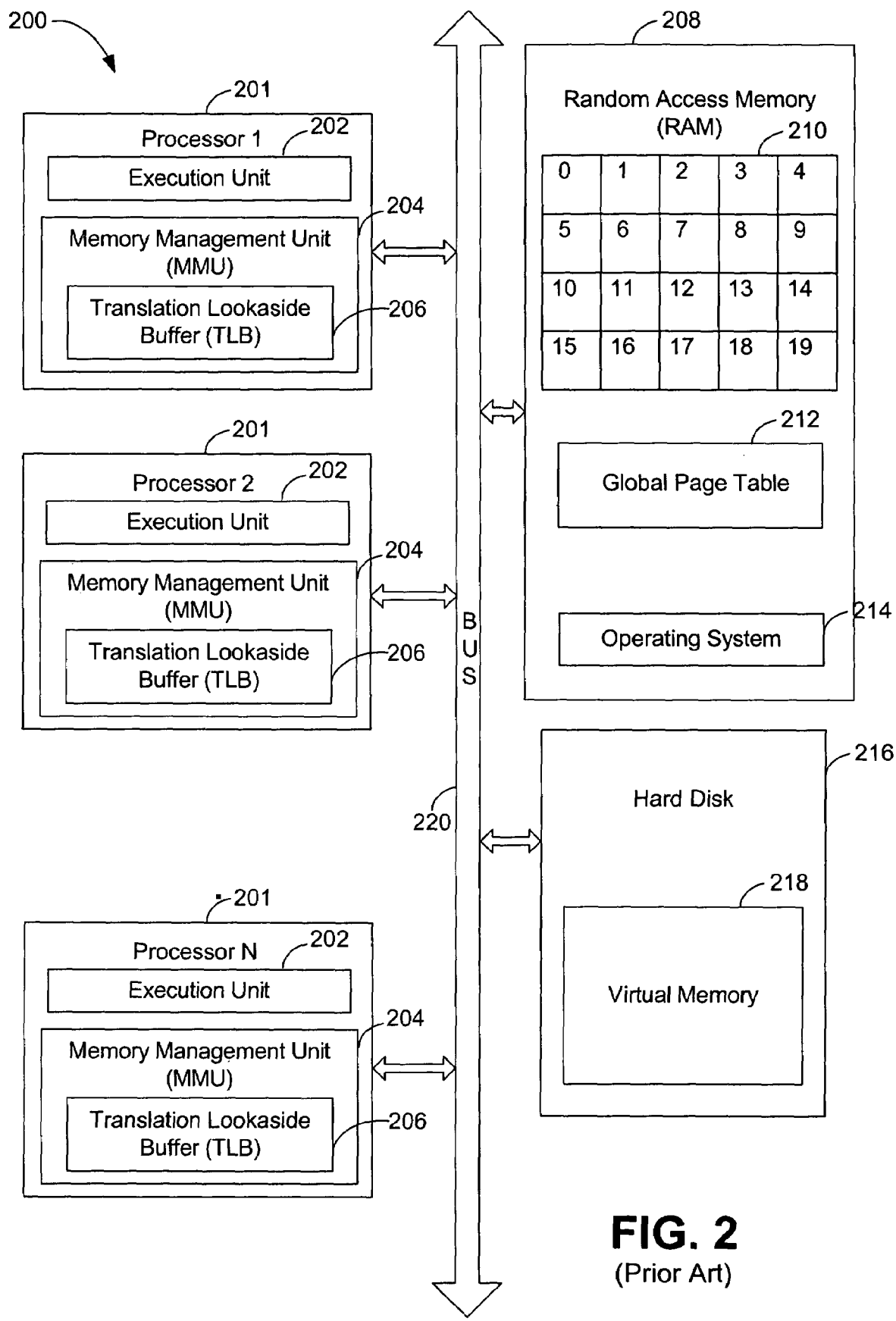
FIG. 2 is a block diagram illustrating a conventional multiprocessor system.

FIG. 2 illustrates a conventional multiprocessor system 200, which employs a virtual memory architecture similar to the one depicted by FIG. 1. The multiprocessor system 200 comprises a plurality of processors 201, which communicate with the other elements of the system 200 via a bus 220. The system 200 further comprises RAM 208, which stores page frames 210, a global page table 212, and an operating system 214. The system 200 also comprises a hard disk 216, which can be partitioned by the operating system 214 to comprise virtual memory 218. The multiprocessor system 200 generally operates much like the system 100 of FIG. 1. In this regard, each processor 201 comprises an MMU 204, which comprises a TLB 206. Each TLB 206 contains virtual/physical address translation pairs.

Each processor 201 operates independent of the other processors 201 in the multiprocessor system 200. Therefore, each TLB 206 of each independent processor 201 contains translation pairs specific to the processor 201 on which the TLB 206 resides. The operating system 216 manages the occupancy of the page frames 210 of RAM 208 for the multiprocessor system 200 via the global page table 212.

During operation, a processor 201 periodically receives, from the bus 220, a purge signal that may be placed upon the bus 220 by another processor 201 or by the operating system 214. The purge signal indicates that there has been a change in the system, e.g., data associated with a physical address has changed, that may affect the veracity of a translation pair contained within the TLB 206 of each processor 201.

Upon receipt of a purge signal, the execution unit 202 routes the purge signal to the MMU 204, which then proceeds to search the TLB 206 for the indicated translation pair. If the translation pair is located within the TLB 206, then the MMU 204 purges the translation pair from the TLB 206. The MMU 204 also purges any resident mini-TLBs and/or resident instruction queues that may contain data related to the indicated translation pair.

Figure 3:
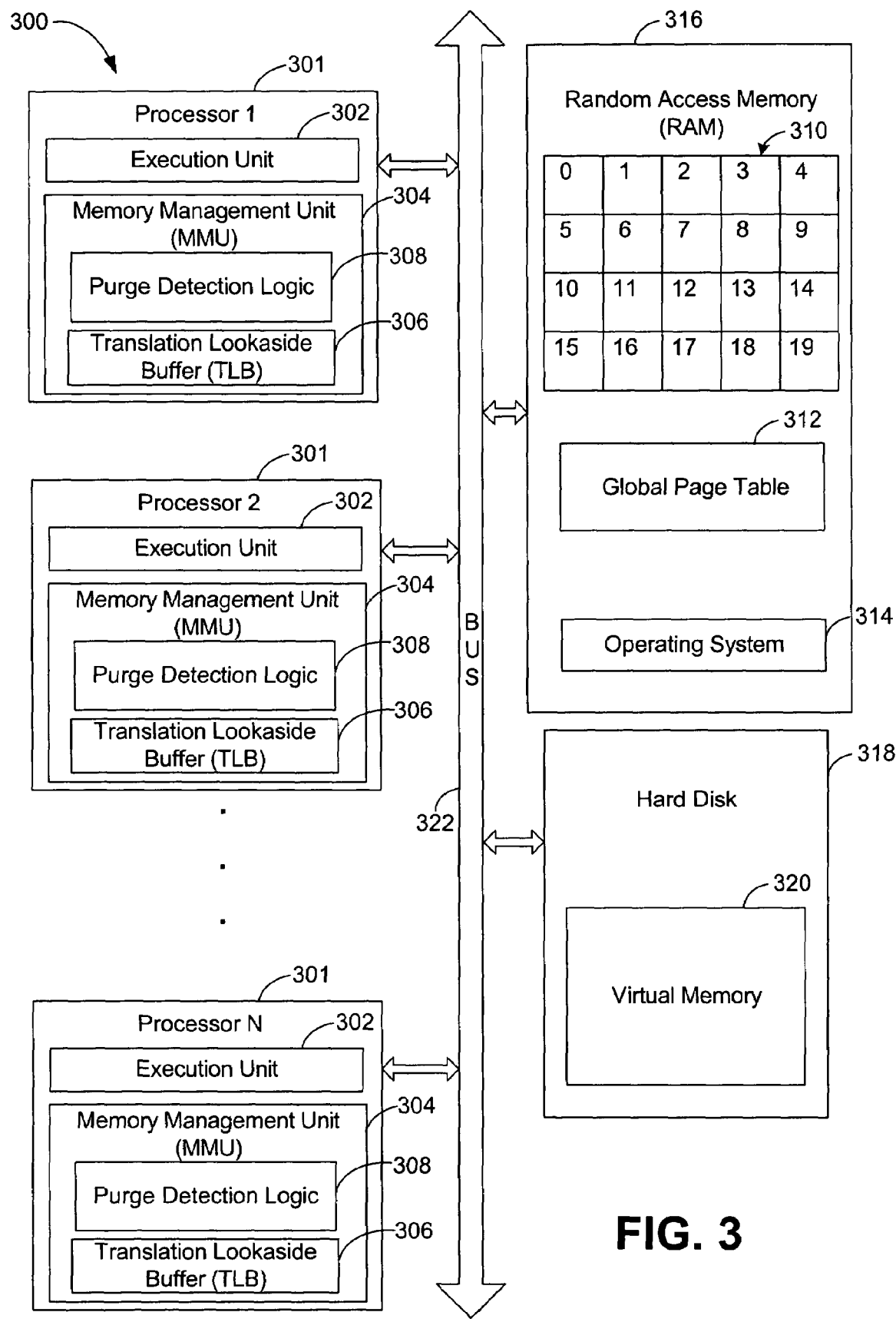
FIG. 3 is a block diagram illustrating a multiprocessor system in accordance with an exemplary embodiment of the present disclosure.

FIG. 3 illustrates an exemplary embodiment of a multiprocessor system 300 of the present disclosure. The system 300 comprises a plurality processors 301. Each processor 301 comprises an execution unit 302, a MMU 304, a TLB 306, and purge detection logic 308. The system 300 further comprises RAM 316, which illustratively comprises twenty (0-19) page frames 310, a global page table 312, and an operating system 314. Note that the number of frames that the RAM 316 is capable of storing may vary depending upon the size of the RAM 316 employed in the system 300. For example, the RAM 316 may comprise two (2) 8-megabyte chips, which provide for 16 megabytes RAM storage. The operating system 314 may be configured to store data in page sizes of four (4) kilobytes. Therefore, the system 300 can store approximately 4000 pages in RAM 316. The system 300 also comprises a hard disk 316, which the operating system 314 can partition to provide virtual memory 320.

During operation, if a physical address associated with a page that is currently loaded into a page frame 310 of RAM 316 or is currently resident in virtual memory 320 of the hard disk 318 becomes stale, then the operating system 314 transmits a purge signal via the bus 322. In response to the purge signal, the MMU 304 searches the TLB 306 to determine if there is a valid translation pair in the TLB 306 corresponding to the address that the purge signal indicates is stale.

If there is a TLB hit, i.e., the MMU 304 finds a translation pair in the TLB 306 corresponding to the purge signal, then the purge detection logic 308 transmits a signal indicating the match. The execution unit 302 of the processor 301 then purges the translation pair from the TLB 306 and clears resident mini-TLBs, instruction queues, and/or other processor components (e.g., integrated circuit components) that may attempt to use the address in continued operation.

However, upon searching the TLB 306, if there is a TLB miss, i.e., the MMU 304 does not find a translation pair in the TLB 306 corresponding to the purge signal, then the purge detection logic 308 transmits a signal indicating no match in the TLB 306. Therefore, the execution unit 302 of the processor 301 does not purge a translation pair from the TLB 306. Further, the execution unit 302 preferably does not purge the resident mini-TLBs, the instruction queues, or any other processor structures in response to the purge signal placed on the bus by the operating system 314.

Figure 4:
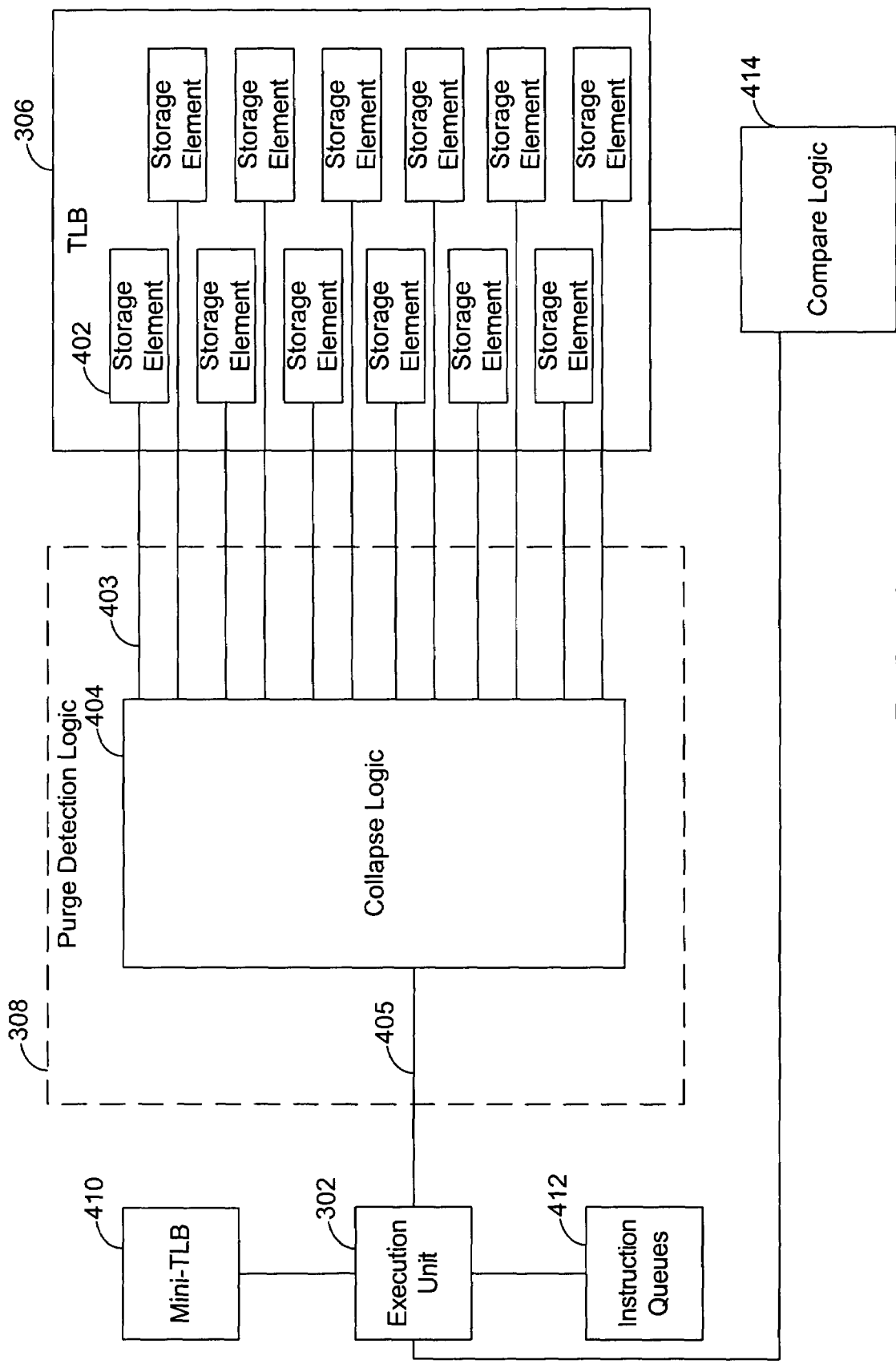
FIG. 4 is a block diagram illustrating a more detailed view of a processor such as is depicted in FIG. 3.

An exemplary embodiment of the purge detection logic 308 of a processor 301 is illustrated in FIG. 4. The purge detection logic 308 preferably comprises collapse logic 404. The TLB 306 comprises a plurality of storage elements 402, each of which comprises an electronic component(s), such as, for example, a flip flop, that is capable of retaining a value, e.g., the value of a particular bit in an 8-bit address, for future access.

When the processor 301 (FIG. 3) receives a purge signal from the system bus 322 (FIG. 3), the execution unit 302 suspends access to the TLB 306. Such access that is suspended by the processor 301 includes, for example, searches performed by the execution unit 302 to locate particular translation information corresponding to a particular virtual address and/or retirements performed by the execution unit 302. Retirement is a process referring to the execution unit 302 completing an instruction (e.g., after a "add" instruction has written a sum to a register).

The execution unit 302 then transmits a signal to the compare logic 414, which compares the purge signal received from the system bus 322 with each storage element 402. The comparison performed by the compare logic 414 is preferably a simultaneous comparison of the purge signal with each storage element 402. The compare logic 414 then causes the match indicator 403 associated with each storage element 402 to be asserted if a hit occurs and deasserted if a miss occurs.

After the comparison of each storage element 402 with the purge signal is completed, the collapse logic 404 of the purge detection logic 308 collapses the plurality of match indicators 403, which indicate whether a match occurred during a comparison of the storage elements 402 with the translation pair data contained within the received purge signal. Note that each storage element 402 preferably stores a set of bits, for example eight (8) bits, which represent a VA. In particular, each match indicator 403 corresponds to a respective translation pair stored in the TLB 306 and is asserted only if the compare logic 414 determines that the data stored by the storage element 402 corresponds to the purge signal. The collapse logic 404 detects the logical value of each of the match indicators 403 and collapses the plurality of match indicators 403 into a single match value 405 indicative of whether the compare logic 414 detected a match upon comparison of the purge signal with each of the values contained in the storage elements 402.

Note that each of the storage elements 402 may represent an array of flip flops or other types of logical devices capable of retaining an array of values representative of an address. For example, each storage element 402 may comprise an array of edge-triggered latches. As such, the collapse logic 404 may detect the match indicators 403 in response to a clock signal to ensure that the compare logic 414 has completed its comparison of all the storage elements 402. As an example, the collapse logic 404 may "OR" each match indicator 403 to evaluate into a single value that is asserted if any of the match indicators 403 is asserted.

Further note that the collapse logic 404 may be implemented with tiered arrays of AND gates, NAND gates, OR gates, and/or NOR gates. In this regard, if one of the match indicators 403 is asserted upon a match by compare logic 414, then the purge detection signal 405 is asserted indicating that the virtual address value was detected in the TLB 306. Also note, more than one address translation pair may match a given purge signal. If one or more pairs match, the other structures are preferably flushed.

The execution unit 302 continues normal execution after examining the purge detection signal 405 of the purge detection logic 308. Note that the execution unit 302 may be configured to examine the purge detection signal 405 upon completion of a predetermined number of clock cycles following stalled access to the TLB 306. In this regard, the execution unit 302 examines the purge detection signal 405 when it is sure that the compare logic 414 has completed comparing each storage element with the purge signal.

If the purge detection signal 405 is asserted, then the execution unit 302 preferably purges the translation pair(s) contained in the TLB 306 related to the purge signal and the processor purges any resident mini-TLBs 410 and/or instruction queues 412. After purging the TLB and the mini-TLBs 410 and/or the instruction queues 412, the execution unit unstalls access of the TLB.

However, if the purge detection signal 405 is not asserted, then although a purge signal was received by the processor 301, the purge signal did not correspond to a translation pair located in the TLB 306. Therefore, the execution unit 302 does not purge the TLB 306 or any other processor structure, e.g., mini-TLBs 410 or instruction queues 412, and unstalls access to the TLB 306 so that normal operation of the processor 301 can continue.

Thus, if a purge signal is received by the execution unit 302 and the compare logic 414 locates the translation pair in the TLB 306, then the translation pair in the TLB 306 is purged and all other mini-TLBs 410 and instruction queues 412 are purged. If it does not match a translation pair located in the TLB 306, then the processor does not perform any additional operations and continues normal execution. As such, the time expended in responding to a purge signal from the system bus 322 is reduced, thereby decreasing the risk of starvation of the processor.

Figure 5:
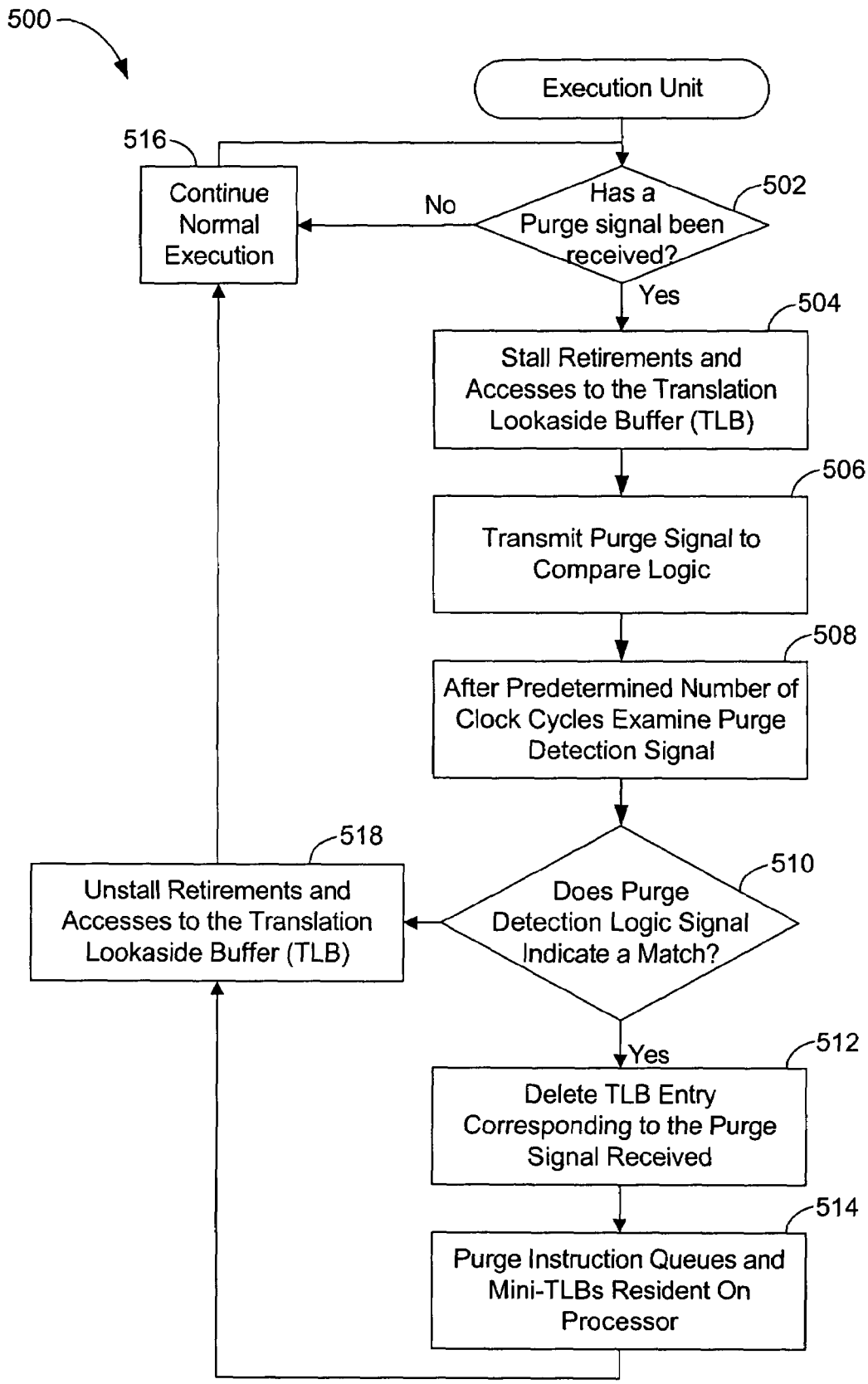
FIG. 5 is a flow chart illustrating an exemplary architecture and functionality of the execution unit of the multiprocessor system depicted in FIG. 3.
Figure 6:
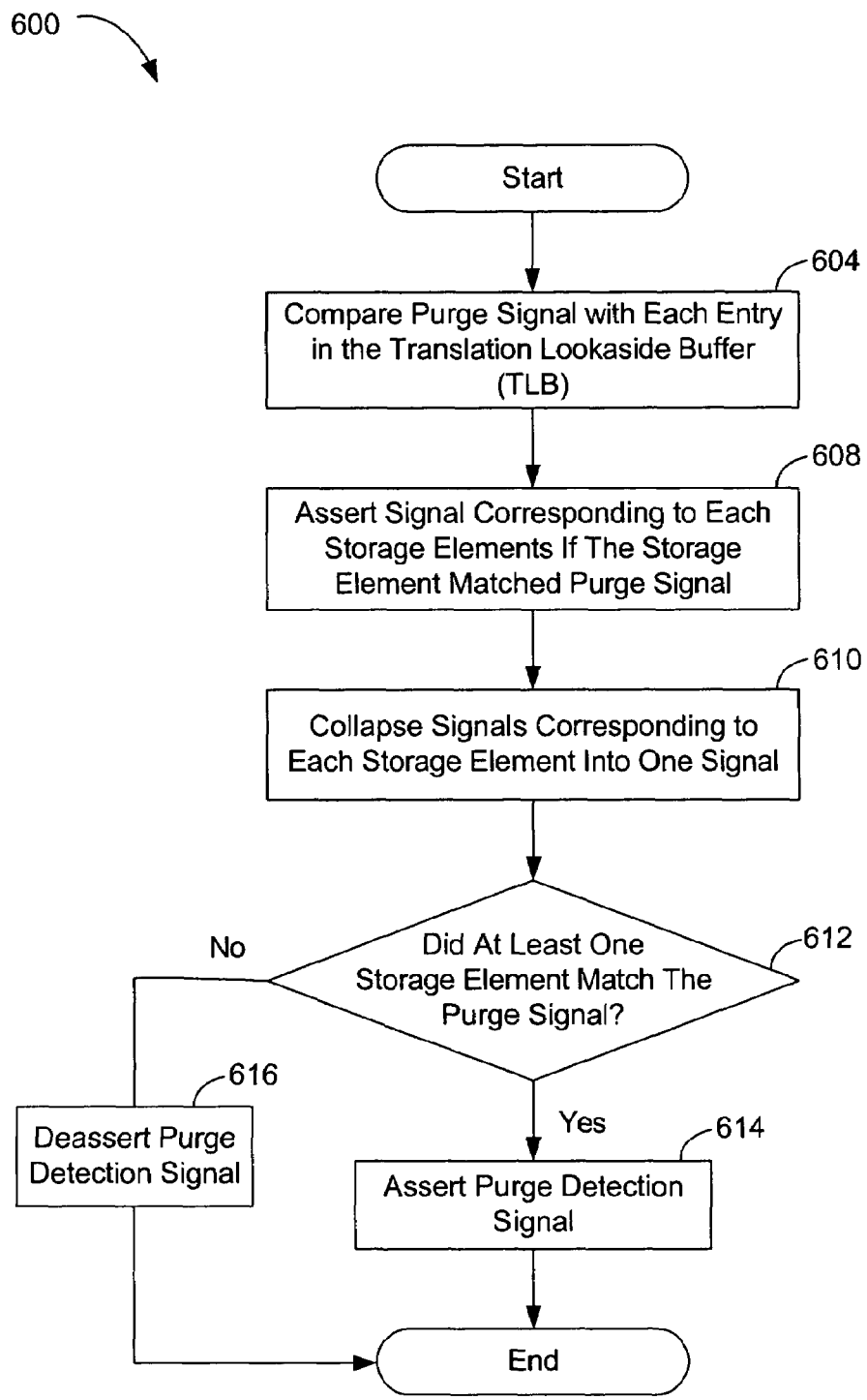
FIG. 6 is a flow chart illustrating a detailed exemplary architecture and functionality of the purge detection logic depicted in FIG. 3.

An exemplary use and operation of the selective purge system 300 and associated methodology are described hereafter with reference to FIG. 5 and FIG. 6.

FIG. 5 illustrates an exemplary architecture and functionality of the execution unit 302 during normal operation. The execution unit 302 continues to operate normally, as indicated in step 516, until a purge signal is received. If a purge signal is received from the system bus 322 (FIG. 3), as indicated in step 502, the execution unit 302 stalls retirements and accesses to the TLB 306 (FIG. 3), as indicated in step 504.

The execution unit 302 then transmits the purge signal to the compare logic 414 (FIG. 4), as indicated in step 506. After a predetermined number of clock cycles, the execution unit examines the purge detection signal 405 (FIG. 4), as indicated in step 508. If the purge detection signal indicates that the purge signal matches a TLB translation pair, as indicated in step 510, then the execution unit 302 deletes the TLB translation pair corresponding to the purge signal received from the system bus, as indicated in step 512. In addition, the execution unit 302 purges instruction queues 412 (FIG. 4) and mini-TLB 410 (FIG. 4) resident on the processor 301 (FIG. 3), as indicated in step 514.

If the purge detection signal does not indicate that the purge signal matches a TLB translation pair, as indicated in step 510, then the execution unit 302 unstalls retirements and accesses to the TLB, as indicated in step 518 and continues normal execution, as indicated in step 516. Note that an embodiment of the execution unit 302 may be configured to continue execution of instructions simultaneous to the comparison and purge detection operation. In this regard, any translation requirements of the instructions may be effectuated by access by the execution unit of the global page table 312, as opposed to first searching in the TLB 306 for the translation. The execution unit 302 denies access to the TLB 306 during comparison and purge detection so that data being purged will not be accessed by the processor 301.

The purge detection logic 308 (FIG. 3) of the processor 301 (FIG. 3) is described with reference to flowchart 600 of FIG. 6. As indicated, the MMU 304 (FIG. 3) compares data in the purge signal with data contained within each translation pair in the TLB 306 (FIG. 3), as indicated in step 604. Preferably, comparison of the values corresponding to each storage element 402 is performed simultaneously, however, consecutive comparisons may also be used. As indicated herein, for illustrative purposes, the MMU 304 is described as being physically located on the processor 301. However, the MMU 304 may be a discrete electronic component(s) or integrated circuit that performs the functionality as described herein with reference to the resident MMU 306. Further note that other embodiments may not comprise MMU 304. The TLB 306 may be implemented as an integral part of the processor 301, which communicates directly with the execution unit 302 (FIG. 3) or other logical elements resident on the processor 301.

In response to the aforedescribed purge signal, the compare logic 414 (FIG. 4) asserts the match indicator signal 403 (FIG. 4) of each storage element 402 (FIG. 4) that matches the received purge signal, as indicated in step 608. The purge detection logic 308 collapses each of the match indicators 403 into a single match value 405 (FIG. 4), indicative of whether there was a TLB hit or a TLB miss, i.e., if the address was located in the TLB 306 or was not found in the TLB 306, as indicated in step 610.

Thus, if at least one storage element 402 of the TLB 306 corresponded to the purge signal, then the purge detection logic 308 asserts the purge detection signal 405, as indicated in steps 612 and 614, respectively. However, if no match is made, then the purge detection signal 405 is deasserted, as indicated in step 616.

The purge detection signal 405 is then examined by the execution unit 302 as described herein with reference to FIG. 5.

Figure 7:
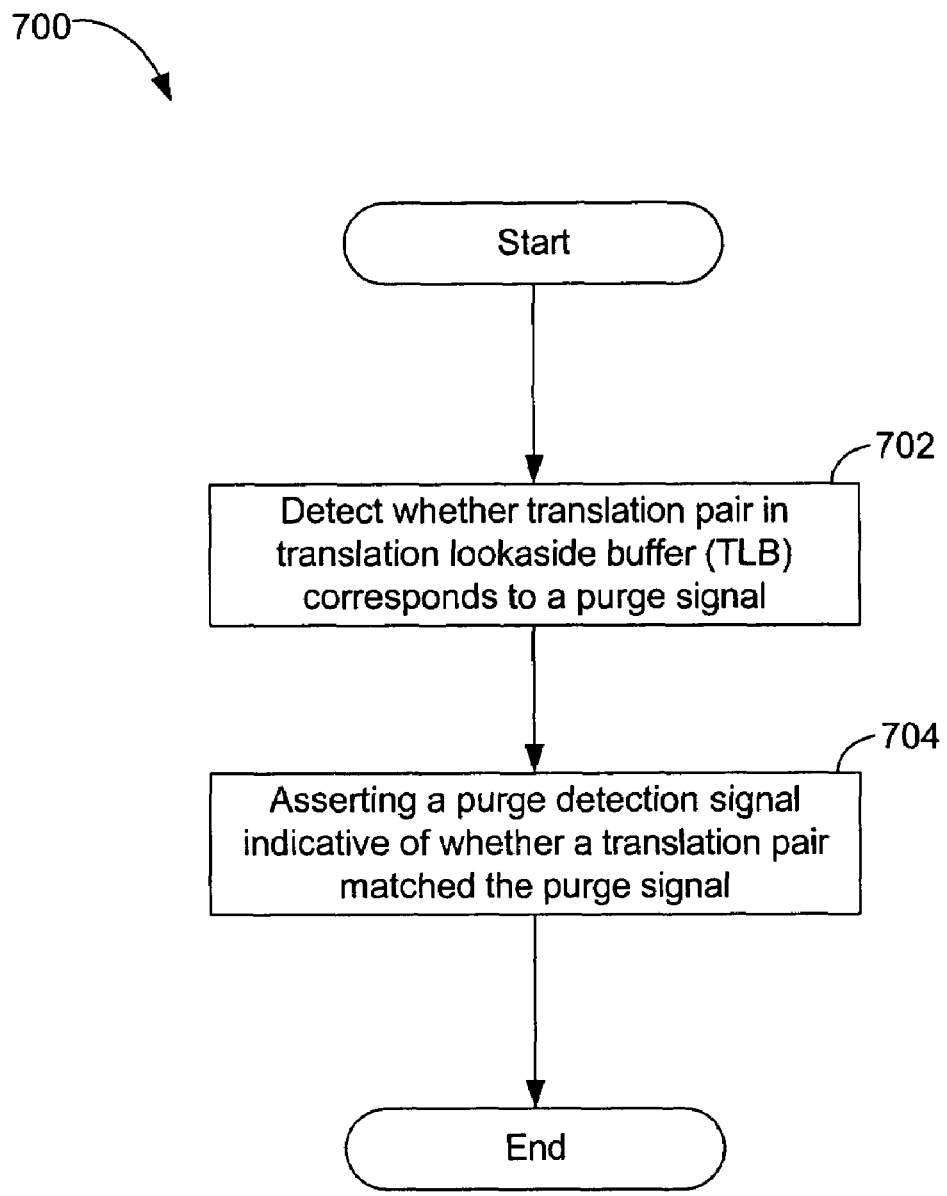
FIG. 7 is a flow chart illustrating an exemplary architecture and functionality of the purge detection logic depicted in FIG. 3.

An exemplary purge detection logic 308 of the processor 301 (FIG. 3) is described with reference to flowchart 700 of FIG. 7. Generally, purge detection logic 308 first detects whether a translation pair in a TLB corresponds to a purge signal, as indicated in step 702. The logic 308 then asserts a purge detection signal indicative of whether a translation pair matched the purge signal, as indicated in step 704.

Now, therefore, the following is claimed:

1. A processor purging system, comprising:
   a translation lookaside buffer (TLB) resident on a processor and having a plurality of translation pairs;
   a component resident on the processor; and
   logic configured to receive a purge signal and to make a determination whether any of the translation pairs in the TLB corresponds to the purge signal, the logic configured to purge, in response to the purge signal, one of the translation pairs in the TLB if any of the translation pairs in the TLB corresponds to the purge signal, the logic further configured to determine, based on whether any of the translation pairs in the TLB corresponds to the purge signal, whether to search the component resident on the processor for information related to an address indicated by the purge signal, the logic further configured to purge the information from the component in response to the purge signal if any of the translation pairs in the TLB corresponds to the purge signal.

2. The system of claim 1, wherein the component comprises an instruction queue.

3. The system of claim 2, wherein the component comprises a mini-TLB.

4. The system of claim 1, further wherein the logic is configured to compare the purge signal with each of the plurality of translation pair and to transmit a plurality of match signals corresponding respectively to the plurality of translation pairs, each of the match signals indicating whether the corresponding translation pair corresponds to the purge signal.

5. The system of claim 4, wherein the logic is further configured to collapse the match signals into a purge detection signal, and wherein the logic is configured to determine, based on the purge detection signal, whether to search the component for the information.

6. The system of claim 5, wherein the logic comprises a plurality of tiered logical AND gates configured to collapse the match signals into the purge detection signal.

7. The system of claim 5, wherein the logic comprises a plurality of tiered logical OR gates configured to collapse the match signals into the purge detection signal.

8. A method for purging a processor, comprising:

detecting whether any of a plurality of translation pairs in a translation lookaside buffer (TLB) corresponds to a purge signal;

if any of the translation pairs in the TLB corresponds to the purge signal, purging the translation pair corresponding to the purge signal; determining whether to search an instruction queue for information related to an address indicated by the purge signal based on whether any of the translation pairs in the TLB corresponds to the purge signal; and purging the information from the instruction queue based on the determining.

9. The method of claim 8, wherein the detecting further comprises:

comparing the purge signal with each translation pairs; and transmitting match signals, each of the match signals indicative of whether a respective one of the translation pairs corresponds to the purge signal.

10. The method of claim 9, further comprising collapsing each of the match signals into the purge detection signal.

11. A processor purging method, comprising:

detecting whether any of a plurality of translation pairs within a translation lookaside buffer (TLB) resident on a processor corresponds to a purge signal;

determining, based upon the purge detection signal, whether to search a component resident on the processor for information related to an address indicated by the purge signal based on whether any of the plurality of translation pairs within the TLB corresponds to the purge signal;

purging the information from the component in response to the determining; and if any of the translation pairs in the TLB corresponds to the purge signal, purging from the TLB the translation pair corresponding to the purge signal.

12. The method of claim 8, wherein the determining comprises determining not to search the instruction queue for the information in response to the purge signal if none of the translation pairs corresponds to the purge signal.

13. The method of claim 11, wherein the component comprises an instruction queue, and wherein the method further comprises purging the instruction queue in response to the purge signal if a detection is made in the detecting step that any of the translation pairs within the TLB corresponds to the purge signal.

14. A processor, comprising:

an execution unit;

an instruction queue coupled to the execution unit;

a translation lookaside buffer (TLB) configured to store a plurality of translation pairs, each translation pair having a respective virtual address and a respective physical address; and logic configured to receive a purge signal and to make a determination as to whether any of the translation pairs stored in the TLB corresponds to the purge signal, the logic configured to purge from the TLB one of the translation pairs if any of the translation pairs stored in the TLB corresponds to the purge signal, the logic further configured to determine, based on the determination, whether to search the instruction queue for information related to an address indicated by the purge signal and to purge the information from the instruction queue if any of the translation pairs stored in the TLB corresponds to the purge signal.

15. The processor of claim 14, wherein the logic is configured to refrain from purging the instruction queue in response to the purge signal unless a translation pair stored in the TLB corresponds to the purge signal.

16. A method, comprising:

storing a plurality of translation pairs in a translation lookaside buffer(TLB) resident on a processor, each of the translation pairs having a respective virtual address and a respective physical address;

receiving a purge signal identifying a stale translation pair;

determining whether any of the plurality of translation pairs in the TLB is identified by the purge signal;

if a translation pair in the TLB is identified by the purge signal, purging the translation pair identified by the purge signal; and determining whether to purge, from a component resident on the processor other than the TLB, information related to an address indicated by the purge signal based on the determining whether any of the plurality of translation pairs in the TLB is identified by the purge signal.

17. The method of claim 16, wherein the determining whether to purge comprises determining not to purge the component if none of the translation pairs in the TLB is identified by the purge signal.

18. The method of claim 16, further comprising, if a translation pair in the TLB is identified by the purge signal, purging the component in response to the determining whether to purge.

19. The method of claim 18, wherein the component comprises an instruction queue.

* * * * *

UNITED STATES PATENT AND TRADEMARK OFFICE
CERTIFICATE OF CORRECTION

PATENT NO.        : 7,543,291 B2
APPLICATION NO.   : 10/632772
DATED             : June 2, 2009
INVENTOR(S)       : Gregg Bernard Lesartre et al.

It is certified that error appears in the above-identified patent and that said Letters Patent is hereby corrected as shown below:

On the title page, in item (75), in "Inventors", delete "Lesartr" and insert -- Lesartre --, therefor.

In column 8, line 55, in Claim 4, delete "pair" and insert -- pairs --, therefor.

In column 9, line 22, in Claim 9, after "each" insert -- of the --.

Signed and Sealed this

Twenty-ninth Day of September, 2009

David J. Kappos
*Director of the United States Patent and Trademark Office*